March 31, 1964  J. L. HATHAWAY  3,127,584
ADJUSTABLE BEARING CHANNEL FOR ECHO RANGING SYSTEM
Filed April 7, 1950  2 Sheets-Sheet 1

INVENTOR
J. LEWIS HATHAWAY
BY
ATTORNEY

March 31, 1964 J. L. HATHAWAY 3,127,584
ADJUSTABLE BEARING CHANNEL FOR ECHO RANGING SYSTEM
Filed April 7, 1950 2 Sheets-Sheet 2

INVENTOR
J. LEWIS HATHAWAY
BY
ATTORNEY

United States Patent Office 3,127,584
Patented Mar. 31, 1964

3,127,584
ADJUSTABLE BEARING CHANNEL FOR
ECHO RANGING SYSTEM
Jarrett Lewis Hathaway, Manhasset, N.Y., assignor to the United States of America as represented by the Secretary of the Navy
Filed Apr. 7, 1950, Ser. No. 154,605
7 Claims. (Cl. 340—3)

This invention relates to scanning echo ranging systems and is particularly directed to an apparatus which forms an adjustable beam type transducer connected to an auxiliary receiving channel in such a system.

In scanning echo ranging systems as heretofore disclosed, the operator is provided with a cathode ray tube which is arranged and energized as a (acts as) plan position indicator showing the entire underwater horizon so that all signals from the transducer are present on the indicator. There are times, however, when a particular echo should be received and displayed (concentrated on) to the exclusion of all others, or when it is desired to listen exclusively to a particular noise source. It then becomes advantageous to employ an auxiliary commutator system to utilize certain of the commutator elements and thus provide the functional equivalent of a "searchlight system," wherein indication may be provided by an additional oscilloscope, a loudspeaker, and a recorder as desired.

The primary object of the present invention is to provide means whereby any selected set of transducer elements in a scanning type transducer may be utilized additionally to form a highly directional sound beam together with means to indicate the relative direction and the output of the beam so formed.

Another object of the invention is to provide means whereby any selected set of elements of a scanning transducer may be connected to form two slightly divergent overlapped lobes of receiving sensitivity which may be rotated at will and utilized to indicate with a high degree of accuracy the relative bearing of an echo-producing object or noise source.

A further object is the provision of means associated with a commutator type scanning transducer for employing selected transducer elements as components of a manually adjustable directed beam transducer for detailed investigation of objects detected by scanning.

Other objects and features of the invention will become apparent to those skilled in the art as the disclosure is made in the following detailed description of a preferred embodiment of the invention as illustrated in the accompanying sheets of drawings in which.

Figure 1:
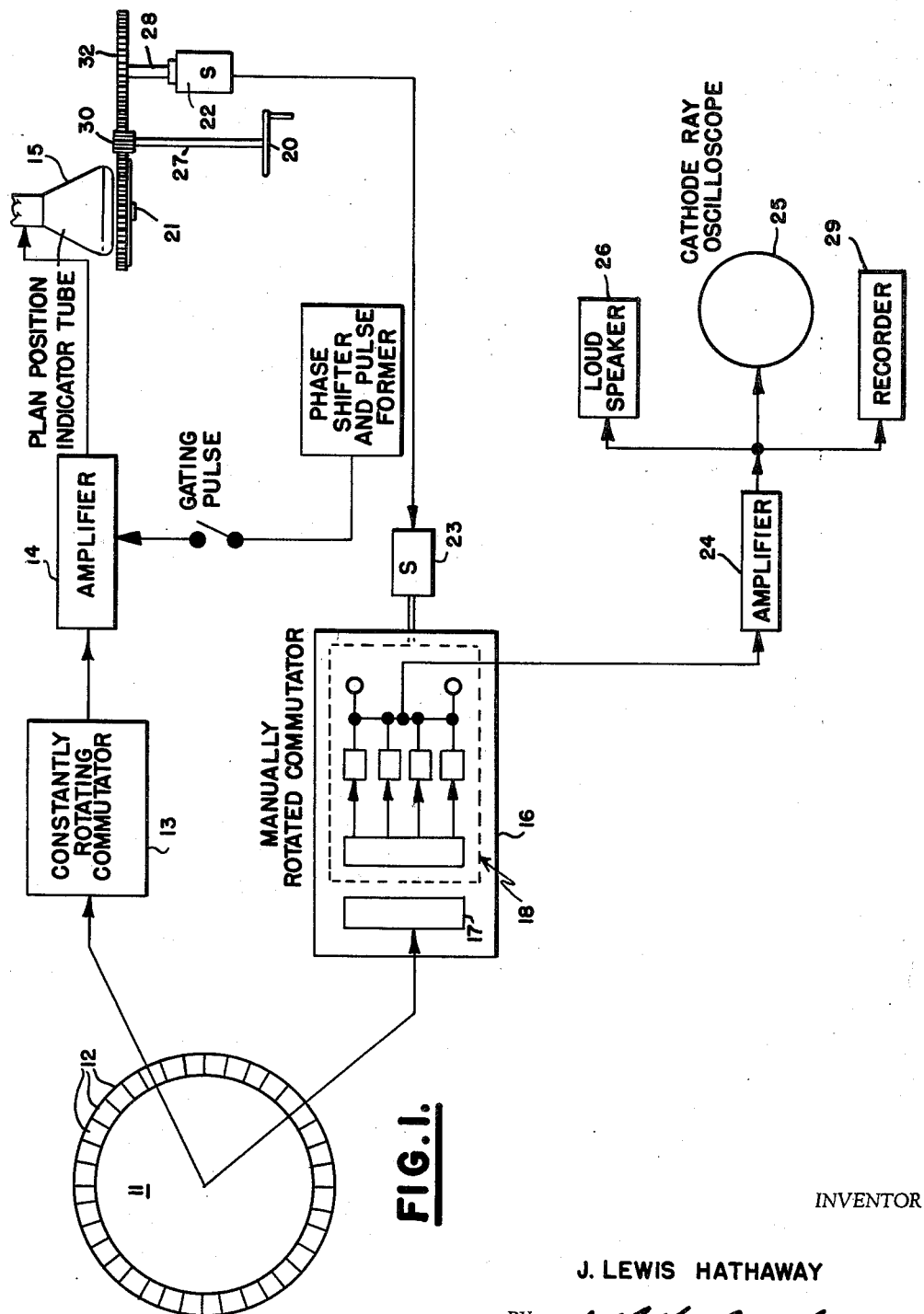
FIG. 1 is a diagrammatic view illustrating the mechanically adjusted commutator and cursor used in conjunction with the plan position indicator tube.

Referring to FIG. 1, the invention includes a transducer 11 which is constructed with a plurality of discrete elements 12 arranged in a cylindrical array each facing a portion of the underwater horizon so that the entire area is approximately circular. If it is desired to omit any portion of the horizon, such as that facing directly aft of the transducer location, this can be done and the interference from propeller noise considerably reduced. In most instances, however, this expedient is not necessary. In the present transducers, 36 or 48 similar elements are provided and a separate lead or pair of leads brought from each element of the array.

There have been two principal scanning methods proposed, one of which is the commutated rotation type shown in application Ser. No. 549,460, now Patent No. 2,697,-822, another of which is the electronically rotated type shown in application Ser. No. 563,042, now Patent No. 2,703,396. For purposes of this disclosure the commutated rotation type has been chosen.

The commutated rotation system includes a constantly rotating commutator 13, the stator of which has one plate for each transducer element, each being connected to one of the transducer elements. The rotor carries the beam forming lag lines as disclosed in the referenced patent applications and effectively connects successive groups of transducer elements forming a beam sensitivity pattern into the system by moving into register with successive stator plates as it is rotated. The output of the rotor is amplified by amplifier 14 and displayed on a cathode ray tube 15.

The simplest form of the present invention includes a second commutator 16 having a stator 17 similar to the stator of the commutator system and which is also connected to the transducer elements, one element for each segment of the stator, in the same manner as commutator 13. A cooperating rotor 18 is disposed in facing relationship to the stator 17 and has its plates capacitatively coupled to the stator plates. While the stator represents a complete circular array of elements, the facing rotor plates are chosen to represent only a segment of the circle. For example, 11 of the 36 or 48 elements may be used at one time. A lag line is provided, and by choosing the components of the lag line, the array of transducer elements from which the signals are connected through the chosen rotor plates, may be made to operate in the same manner as a plane transducer. This is done by introducing progressively decreasing delays from the center element of the array to the side elements thereof so that the center element of the array has its signal delayed by the greatest amount, while the next succeeding side pair, have their signals delayed somewhat less. Successive side pairs, have successively less delay in their signals. By properly choosing the delay periods, a signal incident on the central element can be brought substantially into phase with the same signal entering each other element. The delay period or amount of lag necessary in the circuit of the central element to achieve phase coincidence is equal to the time required for the signal wavefront to pass through the medium from that element to the last pair of elements of the array. This distance is, of course, equal to the setback of the side elements from the plane of the center element. The details of this beam formation are disclosed in the aforementioned application Serial No. 549,460.

Having thus established a beam of sensitivity in the rotor 18 which represents the output of the lag line elements, the present invention includes means to rotate the rotor 18 so that its plates are in register, or partial register, with any desired set of plates on the stator 17. This can be done by manually training the rotor 18 directly or it can be done by training the rotor in accordance with the position of hand wheel 20 located at the sound operator's station.

Figure 2:
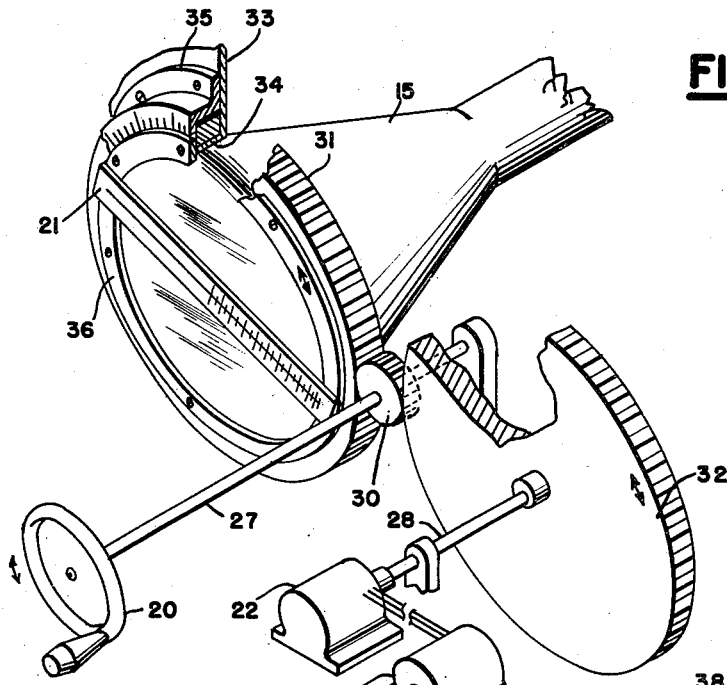
FIG. 2 is a perspective view of mechanical means for adjusting the commutator and direction indicator.
Figure 4:
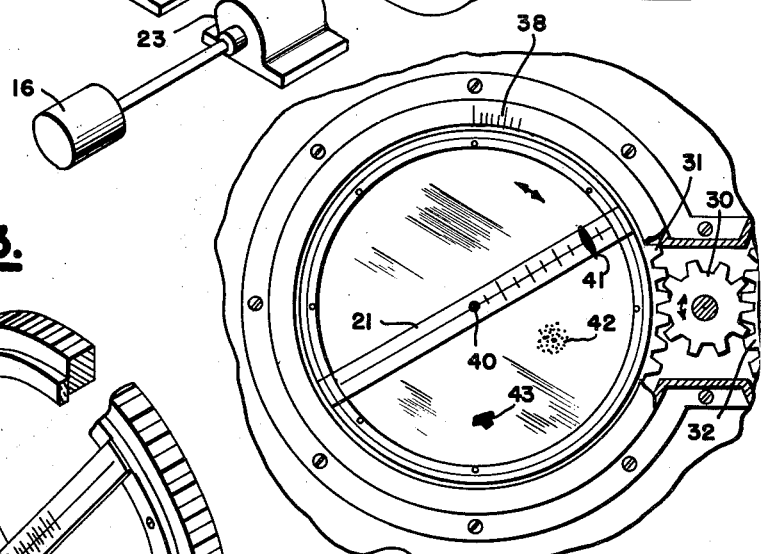
FIG. 4 is a front elevation showing the direction indicator positioned on a plan position indicator tube image of an object being investigated in detail.
Figure 3:
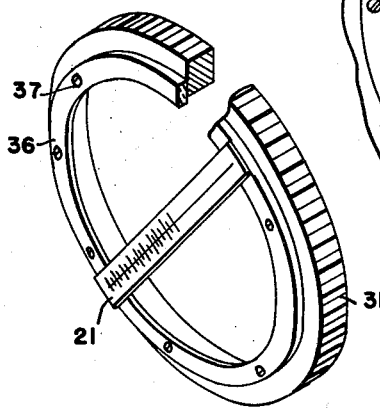
FIG. 3 is a detail of FIG. 2 showing a gear ring and direction indicator mounted thereon.

One means of adjusting the manually operated commutator is shown in FIGS. 2, 3, and 4, wherein the operation is mechanical and the commutator 16 includes the stator 17 and rotor element 18, which is rotated to select the group of transducer elements 12 which form the beam of sensitivity desired. Equivalent results may be obtained by alternate methods of commutation such as the electrical selection of transducer elements, as described in application Serial Number 563,042.

The present invention is best illustrated by the mechanical arrangement of FIG. 2. The hand wheel 20 mounted on shaft 27 operates a pinion drive gear 30 which operates to drive ring gears 31 and 32, each having the same number of gear teeth, whereby gears 31 and 32 assume identical rotations from an initial setting as the wheel 20 is adjusted. The shaft 28 rotates with ring gear 32 and forms a support therefor. The servo transmitter 22 is rotated by shaft 28 in a one-to-one relation, or at a higher speed ratio, as desired. The servo receiver 23 follows the rotation of the driver 22 and in turn drives the commutator 16 at the same speed as shaft 28, thereby keeping the rotor element 18 in identical adjustment with the ring gear 31. The cursor 21 is suitably mounted on the gear 31 to rotate therewith and to indicate bearing or azimuth on the face of tube 15.

The cursor 21 is preferably of transparent plastic and has thereon range marks to facilitate rapid evaluation of ranges of objects under the index lines thereon. The ring gear 31 is preferably mounted about the periphery of the face of tube 15 and may be rotatively secured within a channel formed on the mounting plate 33 by the inner cylindrical ring 34 and an outer retaining flange 35 secured to the plate 33. The plastic ring 36 is fastened concentrically on the face of gear 31, as by screws 37, and rotates within the flange 35 as gear 31 is rotated by pinion 30. The cursor 21 is then secured to the plastic ring 36 to have a center point 40 at the center of the face of tube 15.

In this manner cursor 21 indicates range as distance from the center 40, and the radial line thereon indicates azimuth or bearing, index markings of which are indicated at 38. The zero of bearing, for example, would then correspond to beam sensitivity for the manually rotated commutator directly ahead of the craft carrying the equipment.

By the arrangement shown the plan position indicator, or PPI, indication on tube 15 may consist of an object of interest, as ship image 41, and of a large number of other images such as seaweed images 42 and rocks 43, etc. The cursor, however, may be set on any one of the images, or on each image of unknown character in succession, and the speaker 26, recorder 29 and oscilloscope 25 are responsive only to the set beam of sensitivity established by commutator 16, all other directions of reception being excluded, and the detailed investigation confined, for as long as desired, to the object or direction of image 41. For this purpose a relatively low persistance screen may be desired on scope 25 to indicate rapid changes in the image, while scope 15 retains the image over at least the period of a complete scan.

As the operator rotates the hand wheel to move the bearing cursor 21, the training movement can be made to operate servo drive 22, the motion of which is followed by servo follower 23 located adjacent to the rotor and connected to the rotor to turn it an amount corresponding to the rotation of the synchro 22 as effected by the hand wheel 20. Thus, in effect, the operator positions the rotor 18 exactly in accordance with the bearing cursor 21 so that the output of the rotor corresponds to a directional beam of sensitivity, the axis of which corresponds to the axis of the cursor. The output of the manually trained rotor is taken through an amplifier 24 and indicated either on a cathode ray tube 25 or through a loud speaker 26 in accordance with prior art disclosures. If the operator is interested in a noise source the output is preferably taken from the center of the lag line, but if the source is a particular echoing body, it is preferable to take the outputs from the ends of the lag line so that the elements are then connected for "simultaneous lobe comparison" in accordance with the disclosure contained in the application Ser. No. 549,598, now abandoned.

It has been found that by choosing the lag line elements to form two divergent beams of sensitivity spaced 10° apart on the rotor and utilizing 11 elements, 9 of them common to both channels, independent beams can be formed which have the following characteristics. Both beams are about 20° wide 6 db down and when subtracted and differentiated the zero points on the main lobe are about 10° apart so that the subtracted and differentiated lobe is about 5° wide, 6 db down. The sharp beam thus formed permits accurate examination and location of an echoing body and the operator can keep the beam trained on the target merely by moving the hand wheel 20 in the direction and to the extent indicated by the cathode ray tube 25.

In addition, or in substitution for the manually trained rotor, there have been established systems by which the output of the constantly rotating rotor 13 is gated or passed only at a preselected adjustable interval. Thus, the output of the rotor 13 is blanked out over all but 10° or 15° of its operating range by impressing a suitable blanking bias on the amplifier associated with this rotor. By adjusting the phase of the blanking pulse, the gate is opened at any desired angular point in the circular sweep and the associated cathode ray tube then displays only that portion of the output of the rotor which is permitted to pass as the gate is open. This permits the operator to concentrate on a narrow segment of the tube face rather than requiring him to make objective discrimination between the target in which he is interested and all the other multiplicity of spots which appear on the tube as the result of other echoing bodies and noise.

It is seen from the foregoing disclosure that a scanning transducer for ranging and azimuth determination measurements may be employed for dual purposes simultaneously in a system, thus providing considerably better information than can be had from the components separately employed. In naval operations the continuously rotating scanner is employed to provide a complete picture of the horizon about a submarine or surface vessel, or for depth scanning. This information is rendered continuously available by an omnidirectional output signal and echoes thereof received by the scanner, which is either mechanically rotated or electrically responsive in a narrow beam of rotating character. The detection of any object of self-noise or reflecting characteristic shows an image on the cathode ray tube 15. Such signal images are sometimes ambiguous and require detailed investigation. In the present system means is provided, as described, for selecting any one of the many simultaneously shown images and investigating the selected images to the exclusion of all others. The cursor is adjusted to pass the direction indicating line through the signal image desired, and the auxiliary detector automatically responds to signals received only from that direction, but furnishes in connection with the visual plan position indicator or PPI image an auxiliary image of increased sensitivity and of continuous duration as long as desired. The PPI image is, of course, intermittent in character because of beam rotation but appears continuous only because of tube image persistence. The scanner signal is unsuited for auditory signals, but the present device presents a continuous signal from the second commutator arrangement, whereby loudspeaker signals including Doppler effects may be correlated as desired with any PPI image of suspicious character and the nature of the images may be investigated in any desired sequence, while still exploring for new sources of signal on the PPI. Thus the continuous or detailed investigation of particular objects is rendered simultaneous with the continued scanning of the whole horizon. Furthermore, the relation of the detail to the background and surrounding objects is assured by coupling the manually adjusted commutator to the cursor indicating the point or direction of the detail in relation to the nearby images.

Obviously many modifications and variations are possible in the light of the above teachings. It is, therefore, to be understood, that within the scope of the appended claims, the invention may be practiced otherwise than as specifically described.

What is claimed is:

1. An echo ranging system employing a multielement transducer for receiving signals over a wide angle and a continuous scanning circuit connected thereto, a manually adjustable beamed receiving circuit connected in parallel with said continuous scanning circuit to said transducer, a plan position indicator device responsively connected to said continuous scanning circuit, a direction indicating index on said device, and means for adjusting said index and said beamed receiving circuit in equal amounts, respectively, whereby said index on said device indicates a direction corresponding to the direction of reception of said beamed receiving circuit.

2. An echo ranging system employing a multielement transducer for receiving signals over a wide angle and a commutator circuit having stator elements connected successively to groups of transducer elements, respectively, for continuous scanning, a second commutator circuit having stator elements connected in parallel with first said stator elements, respectively, a group of rotor elements in said second commutator circuit connected in beam forming array, an observing circuit responsively connected to said group of rotor elements, a plan position indicator tube connected for displaying the output signals from first said commutator circuit, a cursor adjustable at will to indicate the direction of a target displayed on said tube, means for adjusting the direction of the beam received on said group of rotor elements, and means coupling said cursor and said beam forming rotor elements to cause the cursor to indicate the direction of reception selected by said second commutator, whereby said observing circuit is responsive to the signals received in the direction indicated by the cursor.

3. A sonar receiving system having a continuous rotary scanning circuit connected to a circularly arranged transducer element array and displaying received sounds from a scanned arc in plan position about a point representing the center of said arc, a direction indicator superimposed on said displayed plan position and rotatable about said point, a second scanning circuit electrically coupled to said array of transducer elements and forming a receiving directional beam which is adjustable to a desired direction, amplifier and loud speaker means responsively connected to said second circuit to reproduce only sounds received in said directional beam, and means coupling the adjustment of said direction indicator and said directional beam whereby said loud speaker responds to sounds received in the direction indicated in said plan position by said indicator.

4. The system of claim 3 having a cathode ray display device connected to said amplifier means for response to signals in said directional beam, whereby selected images displayed in continuous rotary scan are displayed in detail on said cathode ray device.

5. A sonic ranging system including a circular array of transducer elements responsive to a wide angle of incoming sounds, a constantly rotating commutation device having stator elements connected, respectively, to said transducer elements, an amplifier means connected to said commutation device, a cathode ray indicator tube connected to said amplifier means and energized to display said incoming sounds in plan position about a control point, a direction indicator element pivoted about said point and adjustable to a position superimposed on selected directions in said plan position display, a second commutator device having further stator elements connected, respectively, to said first stator elements and rotor elements electrically coupled to said further stator elements selectively in accordance with a selected listening direction, said rotor elements being interconnected through electrical lag lines to produce a beam of sensitivity, manually adjustable means of rotating said rotor elements to select a direction of listening, and means coupling said direction indicator to the second commutator whereby the direction indicator indicates the direction of said beam of sensitivity on said plan position display.

6. An echo ranging system comprising a stationary multi-element transducer, the elements of said transducer arranged to receive signals over a wide angle, commutating means adapted to scan said transducer elements rapidly to produce a substantially continuous indication of signals, indicating means connected to said scanning means for displaying signal received by said transducer, manually rotatable commutated means for selecting a small segment of transducer elements, and indicating means connected to said manually rotated commutator to display the portion of signal selected.

7. An echo ranging system comprising a stationary multiple element transducer, said elements arranged to form a circular ring and adapted to receive signals over a wide angle, means to scan said transducer elements to produce a substantially continuous indication of signals thereon, indicating means, and blanking means connected between said scanning means and said indicator means to blank out selectively signals from all but a narrow segment of adjacent transducer elements so that said indicator means will display signals received by the narrow segment of transducer elements selected.

References Cited in the file of this patent

UNITED STATES PATENTS

| | | |
|---|---|---|
| 1,893,741 | Hecht et al. | Jan. 10, 1933 |
| 2,407,661 | Harrison | Sept. 17, 1946 |
| 2,488,371 | Bollman et al. | Nov. 15, 1949 |
| 2,536,771 | Rost et al. | Jan. 2, 1951 |
| 2,697,822 | Schuck et al. | Dec. 21, 1954 |